(12) United States Patent
Oskarson et al.

(10) Patent No.: US 12,478,727 B2
(45) Date of Patent: Nov. 25, 2025

(54) COMPENSATION OF PRESSURE DRIVEN LEAKAGE WHILE USING HIGH PRECISION VOLUMETRIC PUMPS

(71) Applicant: Unfors RaySafe AB, Billdal (SE)

(72) Inventors: Fredrik Per Gunnar Oskarson, Brännö (SE); Anders Hans Lindström, Gothenburg (SE); Karl Hannes Hultgren, Gothenburg (SE)

(73) Assignee: Unfors RaySafe AB, Billdal (SE)

( * ) Notice: Subject to any disclaimer, the term of this patent is extended or adjusted under 35 U.S.C. 154(b) by 562 days.

(21) Appl. No.: 18/046,785

(22) Filed: Oct. 14, 2022

(65) Prior Publication Data

US 2024/0123139 A1   Apr. 18, 2024

(51) Int. Cl.
*A61M 5/142* (2006.01)
*A61M 5/145* (2006.01)
*A61M 5/168* (2006.01)

(52) U.S. Cl.
CPC ...... *A61M 5/14216* (2013.01); *A61M 5/1452* (2013.01)

(58) Field of Classification Search
CPC ............ A61M 5/14216; A61M 5/1452; A61M 2005/14208; A61M 2205/3331; A61M 2205/3351; A61M 2205/3355; A61M 2205/702; A61M 5/16854; A61M 2205/70; A61M 5/142; A61M 5/145; A61M 2205/33; A61M 5/16831; F04B 2201/0208; F04B 2201/021; F04B 2201/00; F04B 2201/02; F04B 51/00; F04B 49/08

See application file for complete search history.

(56) References Cited

U.S. PATENT DOCUMENTS

2004/0226344 A1\* 11/2004 Stritzelberger ....... F04B 43/009
                                                                    73/40
2020/0032788 A1\* 1/2020 Mösli ...................... F04B 53/16

\* cited by examiner

*Primary Examiner* — Jason E Flick
(74) *Attorney, Agent, or Firm* — Seed Intellectual Property Law Group LLP

(57) ABSTRACT

Compensation of pressure driven leakage while using high precision volumetric pumps may be provided. A measurement apparatus comprising a pump may be calibrated. Calibrating the measurement apparatus may comprise creating a characterization of leakage through the pump as a function of a pressure difference over the pump. The measurement apparatus may be operated for a predetermined time period to pump a liquid. A measurement of a flow through the measurement apparatus may be determined based on the amount of rotation of the piston. The measurement of the flow may be compensated for leakage of the pump while the measurement apparatus operated for the predetermined time period based on the characterization of leakage and the amount of piston rotation during the period and the monitored pressure difference over the pump.

20 Claims, 4 Drawing Sheets

COMPENSATION OF PRESSURE DRIVEN LEAKAGE WHILE USING HIGH PRECISION VOLUMETRIC PUMPS

TECHNICAL FIELD

The present disclosure relates generally to compensation of pressure driven leakage while using high precision volumetric pumps.

BACKGROUND

An external infusion pump is a medical device used to deliver fluids into a patient's body in a controlled manner. There are many different types of infusion pumps that are used for a variety of purposes and in a variety of environments.

Infusion pumps may be capable of delivering fluids in large or small amounts, and may be used to deliver nutrients or medications such as insulin or other hormones, antibiotics, chemotherapy drugs, and pain relievers. Some infusion pumps are designed mainly for stationary use at a patient's bedside. Others, called ambulatory infusion pumps, are designed to be portable or wearable.

A number of commonly used infusion pumps are designed for specialized purposes. These include an enteral pump, a Patient-Controlled Analgesia (PCA) pump, and an insulin pump. An enteral pump may comprise a pump used to deliver liquid nutrients and medications to a patient's digestive tract. A Patient-Controlled Analgesia (PCA) pump may comprise a pump used to deliver pain medication and is equipped with a feature that allows patients to self-administer a controlled amount of medication, as needed. An insulin pump may comprise a pump typically used to deliver insulin to patients with diabetes. Insulin pumps are frequently used in the home.

Infusion pumps may be powered electrically or mechanically. Different pumps operate in different ways. For example, in a syringe pump, fluid is held in the reservoir of a syringe, and a moveable piston controls fluid delivery. In an elastomeric pump, fluid is held in a stretchable balloon reservoir, and pressure from the elastic walls of the balloon drives fluid delivery. In a peristaltic pump, a set of rollers pinches down on a length of flexible tubing, pushing fluid forward. In a multi-channel pump, fluids can be delivered from multiple reservoirs at multiple rates. A "smart pump" is equipped with safety features, such as user-alerts that activate when there is a risk of an adverse drug interaction, or when the user sets the pump's parameters outside of specified safety limits.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
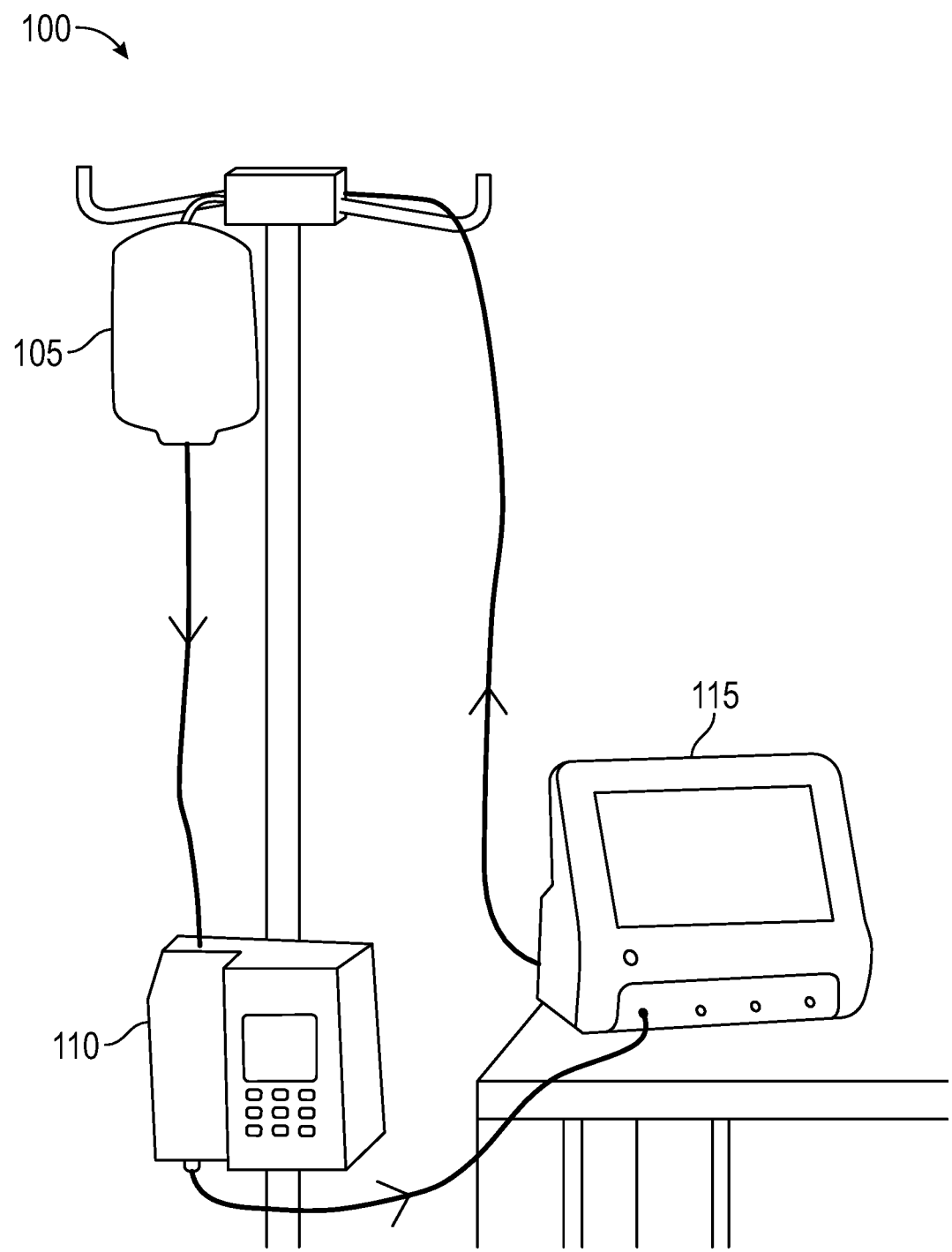
FIG. 1 shows an operating environment for measuring the performance of an infusion pump.

Compensation of pressure driven leakage while using high precision volumetric pumps may be provided. A measurement apparatus comprising a pump may be calibrated. Calibrating the measurement apparatus may comprise creating a characterization of leakage through the pump as a function of a pressure difference over the pump. The measurement apparatus may be operated for a predetermined time period to pump a liquid. A measurement of a flow through the measurement apparatus may be determined based on the amount of rotation of the piston. The measurement of the flow may be compensated for leakage of the pump while the measurement apparatus operated for the predetermined time period based on the characterization of leakage and the determined amount of rotation and the monitored pressure difference over the pump.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may increase measurement performance when using a high precision volumetric pump for volume and flow measurements. High precision volumetric pumps may be used for dispensing in the medical industry. They may also be used to measure an incoming flow and volume (e.g., from an infusion pump). To increase the durability of high precision volumetric pumps, they may lack internal sealing, however, this may mean the pumps exhibit an internal leakage. Embodiments of the disclosure may compensate for the internal leakage and thus increase the accuracy and measurement performance.

High precision volumetric pumps may be used for flow and volume measurements. To achieve a better measurement performance, internal seal may be used. If no seal is used, the measurement uncertainty may increase whenever there is a pressure difference over the pump during operation. However, using seals may limit the lifetime of the system and may require maintenance. Embodiments of the disclosure may remove the need for seals, with maintained measurement performance and thus increases the lifetime and minimizes the maintenance needed.

Consistent with embodiments of the disclosure, a pressure sensor may be mounted on an inlet of a pump and a second pressure sensor may be mounted on an outlet of the pump. During calibration of the pump, the leakage through the pump may be characterized as a function of the pressure difference over the pump. During operation, the pressure difference over the pump may be continuously measured and the leakage of the pump may be compensated for using the measured pressure difference. Embodiments of the disclosure may increase the measurement performance and may negate the need for internal seals, thus maintenance may be minimized and operational lifetime may be increased.

FIG. 1 shows an operating environment 100 for measuring the performance of an infusion pump. As shown in FIG. 1, operating environment 100 may comprise an infusion bag 105, an infusion pump 110, and a measurement apparatus 115. Infusion bag 105 may provide fluids, medication, or nutrients to infusion pump 110. Infusion pump 110 may infuse the fluids, medication, or nutrients into a patient's circulatory system. Infusion pump 110 may generally be used intravenously, although subcutaneous, arterial, and epidural infusions are occasionally used.

Infusion pump 110 may administer fluids in ways that would be impractically expensive or unreliable if performed manually by nursing staff. For example, infusion pump 110 may administer as little as 0.1 mL per hour injections (e.g., too small for a drip), injections every minute, injections with repeated boluses requested by the patient, up to maximum number per hour (e.g., in patient-controlled analgesia), or fluids whose volumes vary by the time of day. Because infusion pump 110 may produce high, but controlled pressures, it may inject controlled amounts of fluids subcutaneously or epidurally.

From time-to-time, the accuracy of infusion pump 110 may be tested by measurement apparatus 115. For example, infusion pump 110 may be programed to deliver a predetermined amount of liquid in a predetermined amount of time. Rather than connecting infusion pump 110 to a patient's circulatory system, it may be connected to measurement apparatus 115 as shown in FIG. 1. Measurement apparatus 115 may measure an actual liquid flow (e.g., volume over unit of time) from infusion pump 110. Then the amount measured by measurement apparatus 115 may be compared to the amount infusion pump 110 was programed to deliver. This comparison may be used to access the accuracy of infusion pump 110.

Figure 2:
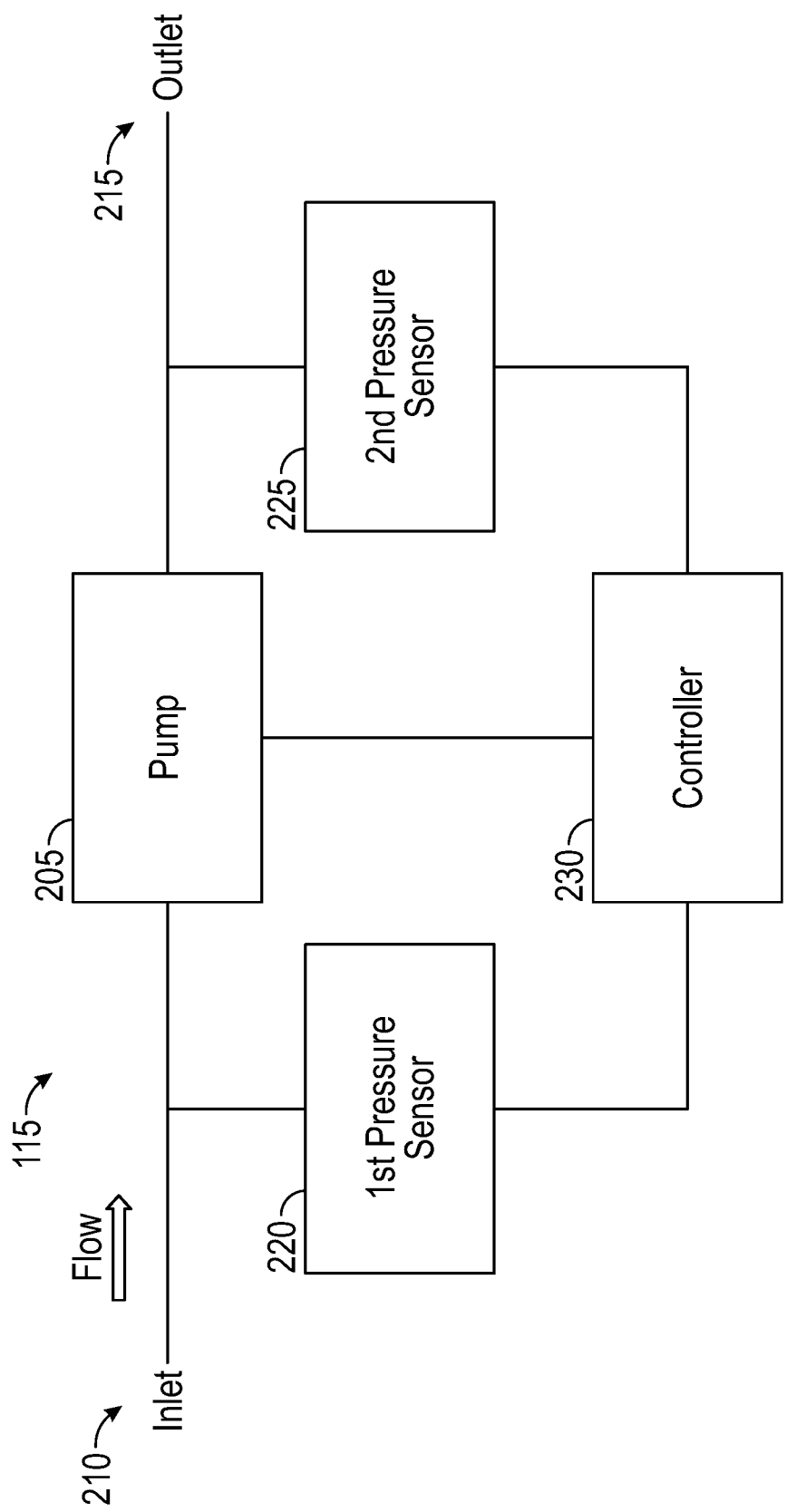
FIG. 2 is a block diagram of a measurement apparatus.

FIG. 2 is a block diagram of measurement apparatus 115. As shown in FIG. 2, measurement apparatus 115 may comprise a pump 205, an inlet 210, an outlet 215, a first pressure sensor 220, a second pressure sensor 225, and a controller 230. Pump 205 may comprise a high precision volumetric pump that may move a volume of liquid in a specified time period providing an accurate volumetric flow rate. Delivery of a liquid in precise adjustable flow rates may comprise metering. Pump 205 may comprise a metering pump that may be piston-driven. Piston-driven pumps may comprise positive displacement pumps that may be designed to pump at a constant flow rates (e.g., averaged over time) against a wide range of discharge pressure. Pump 205 may comprise a piston that may rotate in a correspondingly shaped piston chamber in a pump head. Inlet 210 and outlet 215 may be joined to the piston chamber. Each full rotation of the piston may pump a predetermined volume (e.g., 65 µL).

The pressure at inlet 210 may be measured by first pressure sensor 220. Controller 230 may regulate the pressure at inlet 210 by driving a stepper motor in pump 205. The faster the stepper motor, the lower the inlet pressure. The slower the stepper motor, the higher the inlet pressure. An operator may provide controller 230 with a predetermined pressure value. Controller 230 may regulate the stepper motor speed in order to cause the measured pressure from first pressure sensor 220 to be the same as the predetermined pressure value within a margin of error.

Flow may be calculated as the volume pumped by pump 205, per unit of time. However, the amount of liquid per motor step depends on the pressure difference over pump 205. Consistent with embodiments of the disclosure, by using second pressure sensor 225, embodiments of the disclosure may use the pressure difference over pump 205 to compensate for leakage in pump 205. The leakage may be static or dynamic. Static leakage may be a function of piston position and time. Dynamic leakage may comprise an extra amount of volume pumped per piston rotational movement. The amount of static leakage, for example, may be in the order of 1 µL/h/mmHg. The amount of dynamic leakage, for example, may be in the order of 10 pL/degree of piston rotation.

Second pressure sensor 225 may make it possible to keep measurement precision, while allowing outlet 215 to be connected, for example, to a drain on the floor, or a water container above measurement apparatus 115. The latter may be used to create, for example, a closed loop measurement set-up, where liquid from outlet 215 may be led back to the source.

The elements described above of measurement apparatus 115 (e.g., pump 205, first pressure sensor 220, second pressure sensor 225, and controller 230) may be practiced in hardware and/or in software (including firmware, resident software, micro-code, etc.) or in any other circuits or systems. The elements of measurement apparatus 115 may be practiced in electrical circuits comprising discrete electronic elements, packaged or integrated electronic chips containing logic gates, a circuit utilizing a microprocessor, or on a single chip containing electronic elements or microprocessors. Furthermore, the elements of measurement apparatus 115 may also be practiced using other technologies capable of performing logical operations such as, for example, AND, OR, and NOT, including but not limited to, mechanical, optical, fluidic, and quantum technologies. As described in greater detail below with respect to FIG. 4, the elements of measurement apparatus 115 may be practiced in a computing device 400.

Figure 3:
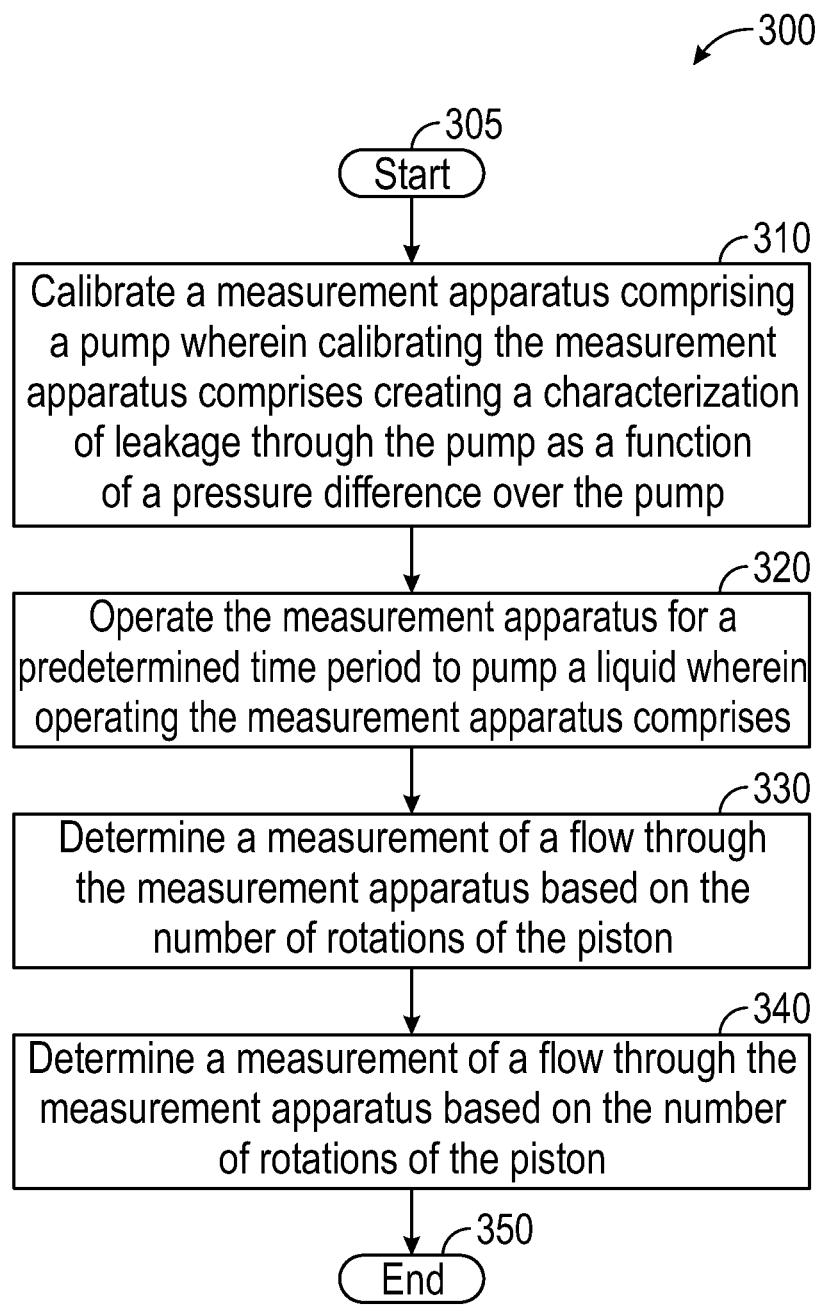
FIG. 3 is a flow chart of a method for providing compensation of pressure driven leakage while using high precision volumetric pumps.

FIG. 3 is a flow chart setting forth the general stages involved in a method 300 consistent with embodiments of the disclosure for providing compensation of pressure driven leakage while using high precision volumetric pumps. Method 300 may be implemented using controller 230 as described in more detail above with respect to FIG. 1. Controller 230 may be embodied by computing device 400 described in more detail below with respect to FIG. 4. Ways to implement the stages of method 300 will be described in greater detail below.

Method 300 may begin at starting block 305 and proceed to stage 310 where controller 230 may calibrate measurement apparatus 115 comprising pump 205. Calibrating measurement apparatus 115 may comprise creating a characterization of leakage through pump 205 as a function of a pressure difference over pump 205. For example, characterization of leakage may comprise a characterization of static leakage and a characterization of dynamic leakage. The characterization of static leakage may be a function of a position of pump 205's piston and time. The characterization of dynamic leakage may be an extra amount of volume pumped per rotational movement of the piston. The characterization of static leakage may comprise a unit of volume per unit of time per unit of pressure difference over the pump (e.g., 1 µL/h/mmHg). The characterization of dynamic leakage may comprise a unit of volume per piston rotation (e.g., 10 pL/degree of piston rotation).

From stage 310, where controller 230 calibrates measurement apparatus 115, method 300 may advance to stage 320 where controller 230 may operate measurement apparatus 115 for a predetermined time period to pump a liquid. Operating measurement apparatus 115 may comprise: i) determining the amount of rotation a piston in pump 205 has made while measurement apparatus 115 operates for the predetermined time period; and ii) monitoring the pressure difference over pump 205 while measurement apparatus 115 operates for the predetermined time period. For example, because controller is driving pump 205, controller may count the amount of rotation it caused the piston in pump 205 to make. Also, because first pressure sensor 220 and second pressure sensor 225 report their readings to controller 230, controller 230 may continuously monitor and store the difference between these readings (i.e., the pressure difference over pump 205).

Once controller 230 operates measurement apparatus 115 for the predetermined time period to pump the liquid in stage 320, method 300 may continue to stage 330 where controller 230 may determine a measurement of a flow through measurement apparatus 115 based on the amount of rotation of the piston. For example, the flow through measurement apparatus 115 may comprise the rotational movement of the piston multiplied by the volume pumped for that amount of rotational movement. Each full rotation of the piston may pump a predetermined volume (e.g., 65 µL) while part of a rotation may pump a predetermined part of the full volume.

After controller 230 determines the measurement of the flow through measurement apparatus 115 based on the amount of rotation of the piston in stage 330, method 300 may proceed to stage 340 where controller 230 may compensate the measurement of the flow for leakage of pump 205 while the measurement apparatus operated for the predetermined time period. This compensation may be based on the characterization of leakage as determined during calibration and the amount of rotation of the piston and the monitored pressure difference over pump 205. For example, during calibration, the amount of static leakage may have been determined to be 1 µL/h/mmHg. This value may be used along with the length of the predetermined time period and the pressure difference over pump 205 that may monitored by controller 230 to determine the amount of static leakage during operation. The measurement of the flow may be compensated for by this determined static leakage.

Furthermore, during calibration, the amount of the dynamic leakage may be in the order of 10 µL/degree of piston rotation. Knowing this value and the amount of piston rotation during the predetermined time period, controller 230 may determine the amount of dynamic leakage during operation. The measurement of the flow may be compensated for by this determined dynamic leakage. Once controller 230 compensates the measurement of the flow for leakage of pump 205 while measurement apparatus 115 operated for the predetermined time period in stage 340, method 300 may then end at stage 350.

Figure 4:
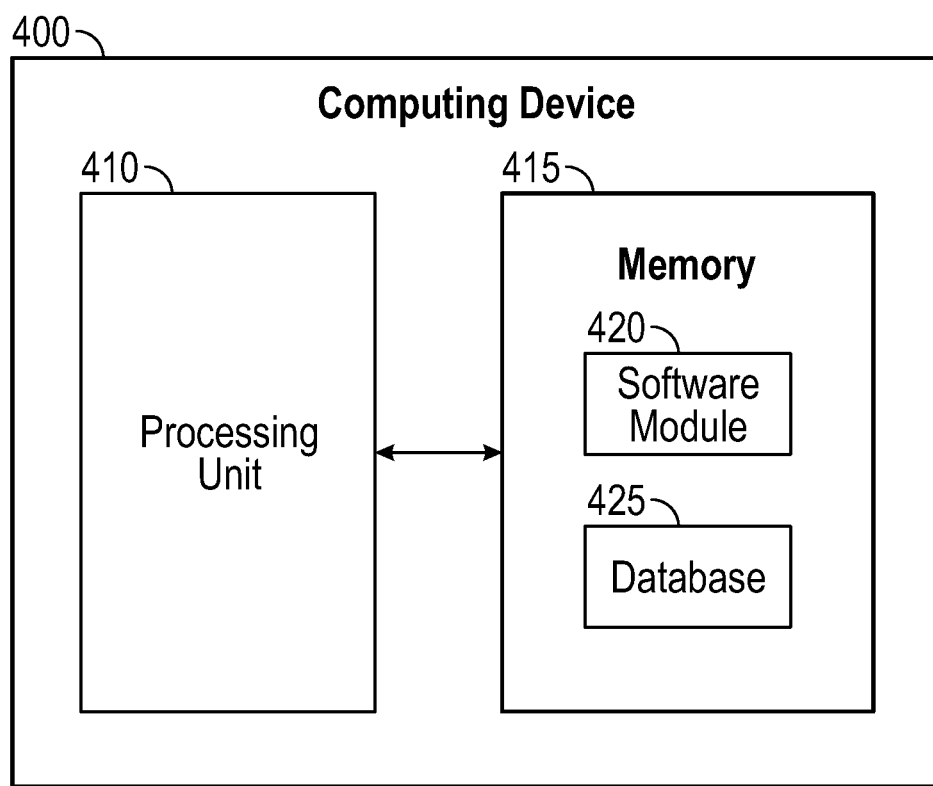
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing compensation of pressure driven leakage while using high precision volumetric pumps as described above with respect to FIG. 3. Computing device 400, for example, may provide an operating environment for pump 205, first pressure sensor 220, second pressure sensor 225, and controller 230. Pump 205, first pressure sensor 220, second pressure sensor 225, and controller 230 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    calibrating a measurement apparatus comprising a pump wherein calibrating the measurement apparatus comprises creating a characterization of leakage through the pump as a function of a pressure difference over the pump;
    operating the measurement apparatus for a predetermined time period to pump a liquid wherein operating the measurement apparatus comprises:
        determining an amount of rotation a piston in the pump has made while the measurement apparatus operates for the predetermined time period, and
        monitoring the pressure difference over the pump while the measurement apparatus operates for the predetermined time period;
    determining a measurement of a flow through the measurement apparatus based on the amount of rotation of the piston; and
    compensating the measurement of the flow for leakage of the pump while the measurement apparatus operated for the predetermined time period based on the characterization of leakage and the amount of rotation during the period and the monitored pressure difference over the pump.

2. The method of claim 1, wherein creating the characterization of leakage comprises creating the characterization of leakage comprising a characterization of static leakage.

3. The method of claim 1, wherein creating the characterization of leakage comprises creating the characterization of leakage comprising a characterization of dynamic leakage.

4. The method of claim 1, wherein creating the characterization of leakage comprises creating the characterization of leakage comprising a characterization of static leakage and a characterization of dynamic leakage.

5. The method of claim 4, wherein the characterization of static leakage comprises a function of a position of the piston and time.

6. The method of claim 4, wherein the characterization of dynamic leakage comprises a characterization of an extra amount of volume pumped per rotational movement of the piston.

7. The method of claim 4, wherein the characterization of static leakage comprises a unit of volume per unit of time per unit of pressure difference over the pump.

8. The method of claim 4, wherein the characterization of dynamic leakage comprises a unit of volume per amount of piston rotation.

9. The method of claim 1, wherein the liquid is supplied by an infusion pump.

10. The method of claim 1, wherein the pump has no seals.

11. The method of claim 1, wherein the pump comprises a high precision volumetric pump.

12. The method of claim 1, wherein the pressure difference over the pump is obtained using a first pressure sensor at an inlet of the pump and a second pressure sensor at an outlet of the pump.

13. A measurement comprising:
    a pump;
    a first pressure sensor configured to measure pressure at an inlet of the pump;
    a second pressure sensor configured to measure pressure at an outlet of the pump;
    a memory storage; and
    a processing unit coupled to the memory storage, wherein the processing unit is operative to:
        calibrate the measure wherein the processing unit being operative to calibrate the measurement apparatus comprises the processing unit being operative to create a characterization of leakage through the pump as a function of a pressure difference over the pump;
        operate the measure for a predetermined time period to pump a liquid wherein the processing unit being operative to operate the measurement apparatus comprises the processing unit being operative to:
            determine an amount of rotation a piston in the pump has made while the measurement apparatus operates for the predetermined time period, and
            monitor the pressure difference over the pump while the measurement apparatus operates for the predetermined time period wherein the pressure difference over the pump is obtained using the first pressure sensor and the second pressure sensor;

determine a measurement of a flow through the measurement apparatus based on the amount of rotation of the piston; and compensate the measurement of the flow for leakage of the pump while the measurement apparatus operated for the predetermined time period based on the characterization of leakage and the amount of rotation during the period and the monitored pressure difference over the pump.

14. The measurement of claim 13, wherein the processing unit being operative to create the characterization of leakage comprises the processing unit being operative to create the characterization of leakage comprising a characterization of static leakage and a characterization of dynamic leakage.

15. The measurement of claim 14, wherein the characterization of static leakage comprises a unit of volume per unit of time per unit of pressure difference over the pump.

16. The measurement of claim 14, wherein the characterization of dynamic leakage comprises a unit of volume per amount of piston rotation.

17. A non-transitory computer-readable medium that stores a set of instructions which when executed perform a method executed by the set of instructions comprising:

calibrating a measurement apparatus comprising a pump wherein calibrating the measurement apparatus comprises creating a characterization of leakage through the pump as a function of a pressure difference over the pump;

operating the measurement apparatus for a predetermined time period to pump a liquid wherein operating the measurement apparatus comprises:

determining an amount of rotation a piston in the pump has made while the measurement apparatus operates for the predetermined time period, and monitoring the pressure difference over the pump while the measurement apparatus operates for the predetermined time period;

determining a measurement of a flow through the measurement apparatus based on the amount of rotation of the piston; and compensating the measurement of the flow for leakage of the pump while the measurement apparatus operated for the predetermined time period based on the characterization of leakage and the amount of rotation during the period and the monitored pressure difference over the pump.

18. The non-transitory computer-readable medium of claim 17, wherein creating the characterization of leakage comprises creating the characterization of leakage comprising a characterization of static leakage and a characterization of dynamic leakage.

19. The non-transitory computer-readable medium of claim 18, wherein the characterization of static leakage comprises a unit of volume per unit of time per unit of pressure difference over the pump.

20. The non-transitory computer-readable medium of claim 18, wherein the characterization of dynamic leakage comprises a unit of volume per amount of piston rotation.

\* \* \* \* \*